(12) United States Patent
Tang

(10) Patent No.: US 6,799,046 B1
(45) Date of Patent: Sep. 28, 2004

(54) METHOD AND SYSTEM FOR LOCATING A MOBILE TELEPHONE WITHIN A MOBILE TELEPHONE COMMUNICATION NETWORK

(75) Inventor: Yuqiang Tang, Plano, TX (US)

(73) Assignee: Nortel Networks Limited, St. Laurent (CA)

( * ) Notice: Subject to any disclaimer, the term of this patent is extended or adjusted under 35 U.S.C. 154(b) by 628 days.

(21) Appl. No.: 09/095,170

(22) Filed: Jun. 10, 1998

(51) Int. Cl.[7] ............................................. H04Q 7/20
(52) U.S. Cl. .................. 455/456.1; 455/436; 455/437
(58) Field of Search ........................... 455/67.1, 432, 455/425, 436, 437, 442, 440, 456, 457, 444, 449, 446, 456.1, 456.5, 456.6, 438, 456.2, 456.3; 342/457, 451

(56) References Cited

U.S. PATENT DOCUMENTS

| | | | | |
|---|---|---|---|---|
| 4,977,399 A | * | 12/1990 | Price | 340/825.44 |
| 5,095,500 A | * | 3/1992 | Tayloe | 379/32 |
| 5,293,642 A | | 3/1994 | Lo | |
| 5,333,248 A | * | 7/1994 | Christensen | 395/142 |
| 5,390,339 A | * | 2/1995 | Bruckert et al. | 455/33.2 |
| 5,471,649 A | * | 11/1995 | Rees | 455/67.4 |
| 5,533,014 A | | 7/1996 | Willars et al. | |
| 5,564,079 A | * | 10/1996 | Olsson | 455/456 |
| 5,657,487 A | * | 8/1997 | Doner | 455/456 |
| 5,724,660 A | * | 3/1998 | Kauser et al. | 455/456 |
| 5,732,354 A | | 3/1998 | MacDonald | |
| 5,736,964 A | | 4/1998 | Ghosh et al. | |
| 5,787,344 A | * | 7/1998 | Scheinert | 455/422 |
| 5,835,849 A | * | 11/1998 | Duque-Anton et al. | 455/33.1 |
| 5,946,611 A | * | 8/1999 | Dennison et al. | 455/404 |
| 5,970,481 A | * | 10/1999 | Westerlage et al. | 705/417 |
| 6,014,565 A | * | 1/2000 | Bonta | 455/437 |
| 6,028,550 A | * | 2/2000 | Froeberg et al. | 342/357.13 |
| 6,362,783 B1 | * | 3/2002 | Sugiura et al. | 342/457 |

* cited by examiner

*Primary Examiner*—Curtis Kuntz
*Assistant Examiner*—Barry W Taylor
(74) *Attorney, Agent, or Firm*—John D. Crane; Dillon & Yudell LLP

(57) ABSTRACT

An improved method for locating a mobile telephone within a cellular telephone communication network is disclosed. The mobile telephone communication network has multiple cells, with each of the cells having a base station coupled to at least one antenna. A cell is initially divided into a number of sections. A location information and a signal information, such as a received signal strength indication, is then collected at each of the sections within the cell. The collected location information and signal information are subsequently processed into a signal information profile database. Utilizing the signal information profile database, the section within the cell at which a mobile telephone is located can be determined.

9 Claims, 4 Drawing Sheets

| SECTION | LOCATION INFORMATION | SIGNAL INFORMATION | | |
|---|---|---|---|---|
| 1 | $xy_1$ | $rss_{1,1}, rss_{1,2}$ | •••• | $rss_{1,M}$ |
| 2 | $xy_2$ | $rss_{2,1}, rss_{2,2}$ | •••• | $rss_{2,M}$ |
| 3 | $xy_3$ | $rss_{3,1}, rss_{3,2}$ | ••••• | • |
| 4 | $xy_4$ | $rss_{4,1}$ | • | • |
| 5 | $xy_5$ | $rss_{5,1}$ | • | • |
| • | • | • | • | • |
| • | • | • | • | • |
| • | • | • | • | • |
| • | • | • | • | • |
| N | $xy_N$ | $rss_{N,1}$ | •••••• | $rss_{N,M}$ |

METHOD AND SYSTEM FOR LOCATING A MOBILE TELEPHONE WITHIN A MOBILE TELEPHONE COMMUNICATION NETWORK

BACKGROUND OF THE INVENTION

1. Technical Field

The present invention relates to a method and system for servicing a wireless communication network in general, and in particular to a method and system for servicing a mobile telephone communication network. Still more particularly, the present invention relates to a method and system for locating a mobile telephone within a cellular telephone communication network.

2. Description of the Prior Art

In a cellular telephone communication network, the service area is divided into multiple cells, with each cell being served by a base station. During normal operation, when a mobile telephone (or mobile station) is moved from one cell to another within the cellular telephone communication network while the mobile telephone has an active connection, the cell currently servicing the mobile telephone will have to perform a hand-off operation during which the mobile telephone is instructed to tune to a new channel served by the base station of the cell into which the mobile telephone is entering.

In the prior art, the selection of a target cell for hand-off is typically based upon a comparison of the received signal strength indication (RSSI) at different neighboring cells, and the cell having the highest RSSI will be selected. However, this simplistic selection algorithm suffers from a lack of accuracy due to the fluctuations of RSSI from shadowing losses in multi-path fading. As a result, suboptimal target cells are often selected, which leads to further unnecessary hand-offs soon thereafter.

Generally speaking, a hand-off operation may be facilitated if the location of a mobile telephone within the cellular telephone communication network is known to the base station performing the hand-off. In addition to location triggered hand-off, there are also other reasons for determining the location of the mobile telephone within the cellular telephone communication network. For example, in order to manage the mobile telephone traffic within the network more efficiently, the telephone service provider needs to know the approximate location of each mobile telephone having an active connection. Furthermore, the ability to locate a mobile telephone within the cellular telephone communication network with an adequate accuracy can also find application in mobile telephone location services, which provide the location information of a mobile telephone to an authorized service subscriber, even if the mobile telephone does not have an active connection.

Aside from the telephone servicing end, it is also desirable to locate mobile telephone users who are making calls. For example, a chief problem with servicing request for a 911-emergency service is that emergency service providers, such as police, generally do not know the location of the mobile telephone user calling the emergency number because of the mobile nature of the telephone. This problem is exacerbated in situation in which the mobile telephone user who called the emergency number cannot provide enough location information to allow the emergency service provider to dispatch emergency services to the location of the call. Thus, there are numerous strong incentives to determine the location of the mobile telephone within the cellular telephone communication network.

Nevertheless, previously installed cellular systems had little capability in this regard. For example, in an Advanced Mobile Phone Service (AMPS) system, a user can be located within a cell by determining which base station antenna is being utilized to service the user. However, a cell can be as large as 3–5 miles in radius, making this information practically useless. While there are other alternative solutions, such as the use of a Global Positioning System (GPS) unit at each mobile telephone, or the use of triangulation algorithm on a transmitting mobile telephone, these and similar approaches are often too costly, if they can even provide a satisfactory result. Consequently, it is desirable to provide an improved method for estimating the location of a mobile telephone within a cellular telephone communication network that is both reliable and cost effective.

SUMMARY OF THE INVENTION

In view of the foregoing, it is therefore an object of the present invention to provide an improved method for servicing a wireless communication network.

It is another object of the present invention to provide an improved method and system for servicing a mobile telephone communication network.

It is yet another object of the present invention to provide an improved method and system for locating a mobile telephone within a cellular telephone communication network.

In accordance with a preferred embodiment of the present invention, a mobile telephone communication network has multiple cells, with each of the cells having a base station coupled to at least one antenna. A cell is initially divided into a number of sections. A location information and a signal information, such as a received signal strength indication, is then collected at each of the sections within the cell. The collected location information and signal information are subsequently processed into a signal information profile database. Utilizing the signal information profile database, the section within the cell at which a mobile telephone is located can be determined.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawing, wherein.

DETAILED DESCRIPTION OF A PREFERRED EMBODIMENT

Figure 1:
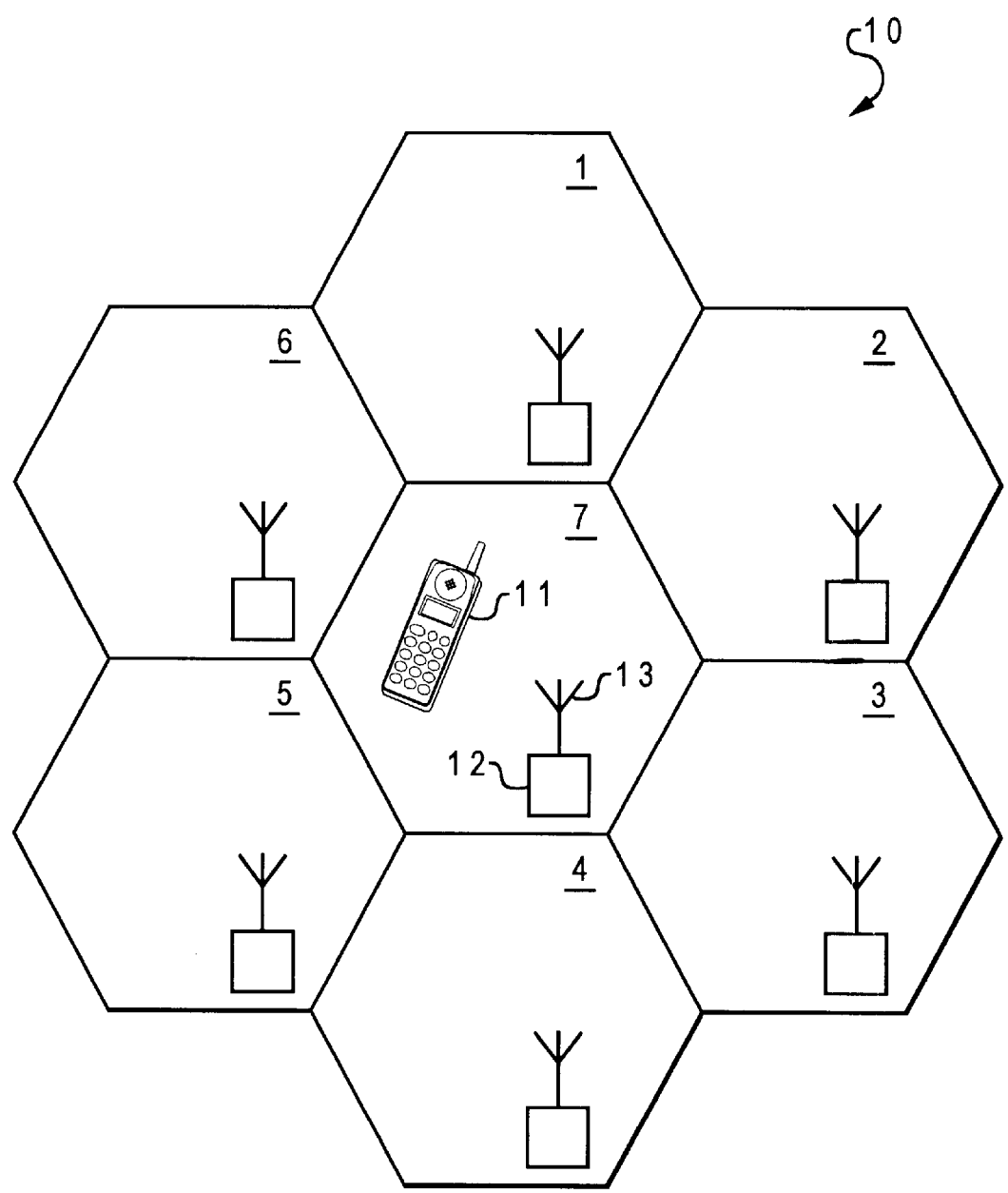
FIG. 1 is a pictorial diagram of a cell cluster within a cellular telephone communication network in which a preferred embodiment of the present invention may be implemented.

Referring now to the drawings and in particular to FIG. 1, there is depicted a pictorial diagram of a cell cluster 10 within a cellular telephone communication network in which a preferred embodiment of the present invention may be implemented. The cellular telephone communication network may utilize an analog protocol such as an advanced mobile phone service (AMPS) or a digital protocol such as a code-division multiple access (CDMA). As part of a larger cellular network, cell cluster 10, which includes cells 1–7 as shown, is commonly known as a seven-cell pattern. Other cell patterns, such as the 120 degree segmented cells and the tiered omni-directional cells, which are well-known to those skilled in the art, may also be utilized. Each cell within cell cluster 10 contains a base station coupled to at least one antenna for transmitting signals to, and receiving signals from, a mobile telephone 11. In this example, mobile telephone 11 is being served by a base station 12 along with an antenna 13 within a cell 7.

Figure 2:
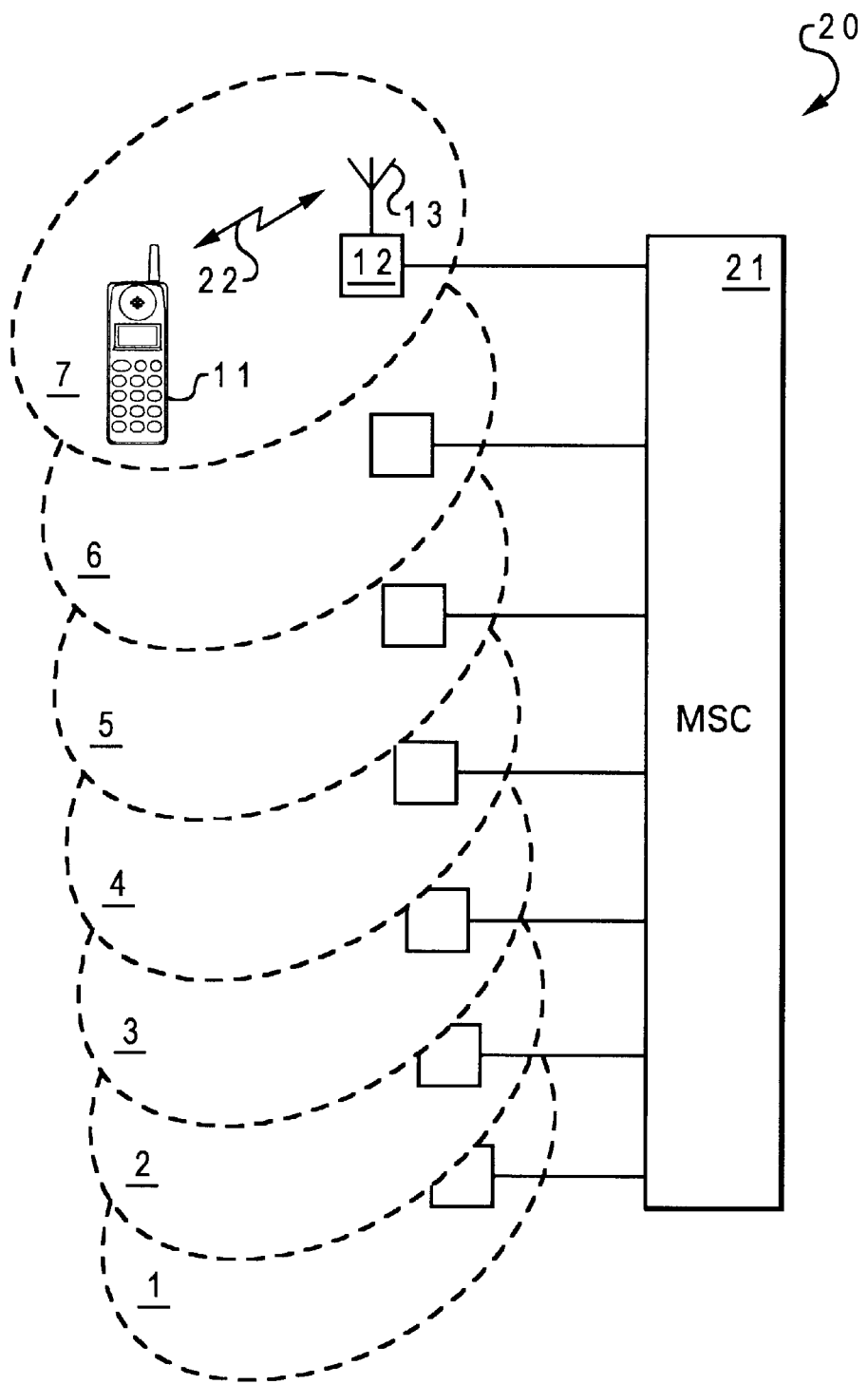
FIG. 2 is a block diagram of a mobile telephone system in accordance with a preferred embodiment of the present invention.

With reference now to FIG. 2, there is illustrated a block diagram of a mobile telephone system in accordance with a preferred embodiment of the present invention. As shown, mobile telephone system 20 includes a mobile switching center (MSC) 21 that is connected to a base station within each of cells 1–7. In this example, MSC 21 communicates with mobile telephone 11 in cell 7 via an air interface 22. As noted above, cell 7, with respect to FIG. 1, contains a base station 12 along with an antenna 13. Preferably, mobile telephone 11 is a digital mobile telephone that operates according to the North American dual-mode CDMA IS-95 standard, and air interface 22 is described by the IS-54 and IS-136 standards.

Each of cells 1–7 is assigned one control channel for transmitting and receiving control signals and several voice channels for transmitting and receiving voice signals. Control signals are communicated between mobile telephone 11 and antenna 13 via cell 7's control channel, while voice signals are communicated between mobile telephone 11 and antenna 13 via one of cell 7's several voice channels. In addition to the communication with a serving cell (in this example, cell 7 is the serving cell because the voice data is being communicated through cell 7), mobile telephone 11 also monitors and measures the signal strength of the control channels of neighboring cells (such as cells 1–6). These control channel signal strength measurements are then sent to MSC 21. In addition, mobile telephone 11 measures the signal strength of the voice signal it is receiving from antenna 13 of serving cell 7. This voice channel signal strength measurement is periodically sent by mobile telephone 11 to MSC 21 via the reverse voice channel of serving cell 7.

The signal strength of the voice channel signal between mobile telephone 11 and antenna 13 varies as mobile telephone 11 travels within cell 7. As mobile telephone 11 enters a neighboring cell, for example, cell 5, the signal strength of the control channel signal from the antenna in cell 5 will become stronger than the signal strength of the voice channel signal from antenna 13. At this point, it is desirable for mobile telephone 11 to terminate communication over the voice channel with cell 7 and to initiate communication via a voice channel of cell 5. This operation is called a hand-off, and is utilized to change the serving cell while mobile telephone 11 is traveling within a geographic service area so that mobile telephone 11 maintains voice channel communication via an antenna (of a base station) having the strongest signal.

Figure 3:
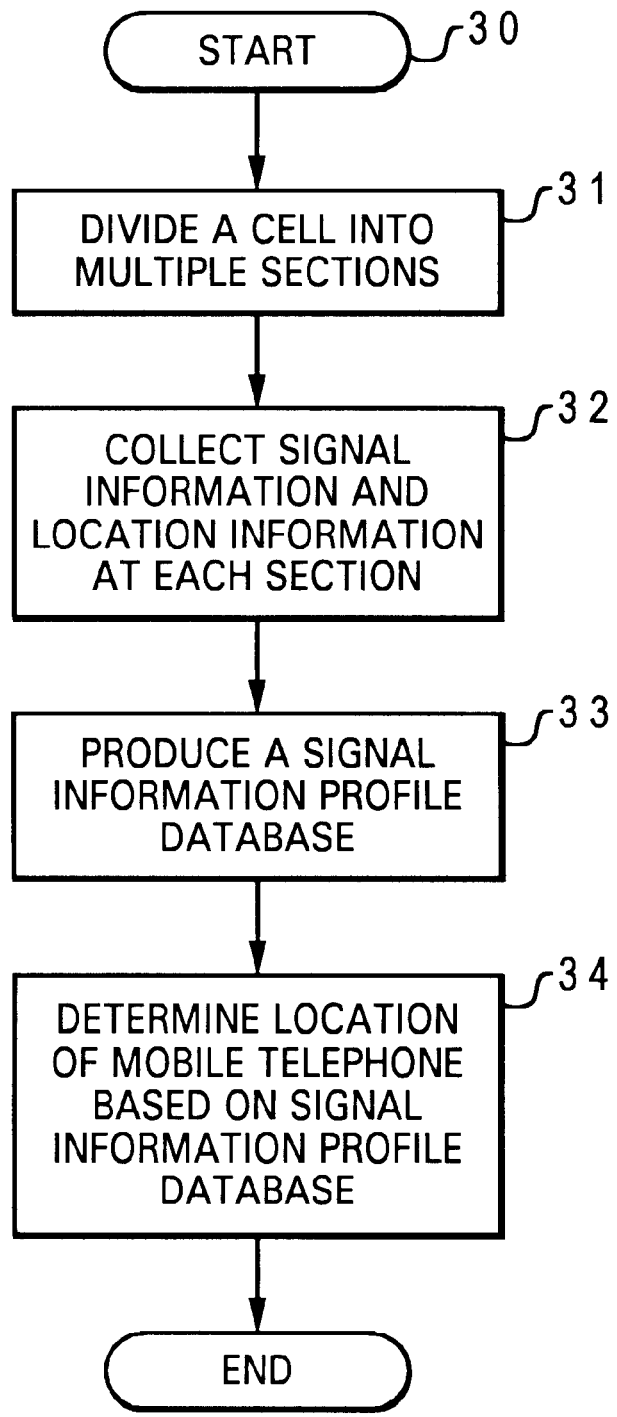
FIG. 3 is a high-level logic flow diagram illustrating a method for locating a mobile telephone within a cellular telephone communication network, in accordance with a preferred embodiment of the present invention.

As mentioned in the background section of the present disclosure, the hand-off operation can be facilitated if the base station performing the hand-off knows the location of the mobile telephone within the serving cell. With reference now to FIG. 3, there is depicted a high-level logic flow diagram illustrating a method for locating a mobile telephone within a cellular telephone communication network, in accordance with a preferred embodiment of the present invention. Starting at block 30, an area intended to be located, such as a serving cell, is divided into multiple sections, as shown in block 31. Then, a location information and a signal information are collected at each of the sections within the cell, as depicted in block 32. This signal information is preferably a received signal strength indication (RSSI); however, other suitable types of signal information may also be utilized. Also, the collection of signal information may be performed by a drive test that is well-known to those skilled in the art. The collected location information and signal information are subsequently processed to produce a signal information profile database for all the sections within the cell, as illustrated in block 33. With the signal information profile database, a section in which the mobile telephone is located can be determined, as shown in block 34. Such determination is preferably performed via a best matching process described below.

Figures 4, 5:
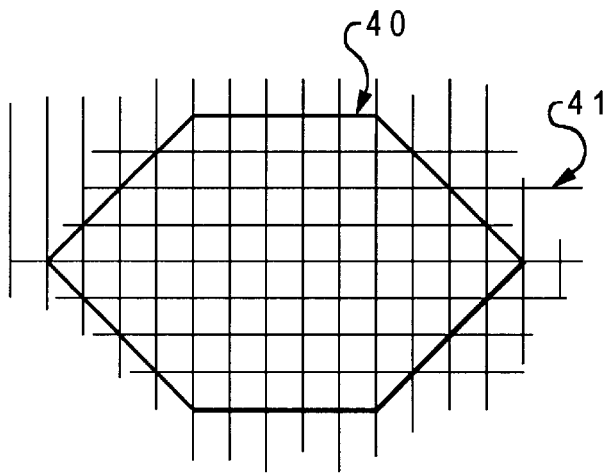
FIG. 4 is a pictorial diagram of a cell that is divided into multiple sections by a grid, in accordance with a preferred embodiment of the present invention.
FIG. 5 illustrates several exemplary entries within a signal information profile database, in accordance with a preferred embodiment of the present invention.

The above-described method may be implemented as follows. Taking a three-mile radius cell as an example, the cell is divided into multiple sections, with each section approximately 50 meters wide. With reference now to FIG. 4, there is illustrated pictorial diagram of a cell 40 that is divided into multiple sections by a grid 41, in accordance with a preferred embodiment of the present invention. Signal information, such as RSSI, measurements are then performed at each section location. The signal information measurement can be performed by one of following two methods:

1. each base station measures signals coming from a mobile telephone on a reverse link (i.e., uplink) and then reports the results to a central location server within a MSC; or
2. the mobile telephone measures signals coming from each of the multiple base stations on a forward link (i.e., downlink) and then reports the results to the central location server within the MSC via the serving cell.

The second method described above is a special capability for mobile telephones that are compliant with the IS-54 and IS-136 standards. According to the IS-54 and IS-136 standards, each cell within a cellular telephone communication network has a predefined mobile assisted hand-off (MAHO) list designed for assisting hand-off operations. A MAHO list contains the signal strengths of the signals that a mobile telephone is receiving over the voice channels of the serving cell and the control channels of all neighboring cells. The MSC maintains a MAHO list for each cell that is under the control of the MSC, and sends an appropriate MAHO list to the mobile telephone, depending on the serving cell. On the other hand, MAHO measurements are periodically sent from the mobile telephone to the MSC via the serving cell's reverse voice channel. The description of the exemplary implementation will be continued with the second method.

All section locations within the cell may be organized in a vector form such as $XY = \{xy_1, xy_2, \ldots, xy_N\}$, where x represents the latitude, and y represents the longitude of each of section locations 1 through N. The signal information, such as RSSI information, collected at each of the section locations 1 through N within the cell may also be organized in a vector form such as $rss_{x,y}$, where x represents a section location (such as one of the section locations 1 through N), and y represents a base station located in a neighboring cell. For example, the RSSI information vector for section location 5 of the cell is represented as $RSSI_5 = \{rss_{5,1}, rss_{5,2}, rss_{5,3}, \ldots rss_{5,M}\}$, with base stations 1 through M. Base stations 1 through M include the base station in the cell containing grid location 5 (the serving cell) and the base station in each neighboring cell of the cell containing section location 5. Accordingly, the section location information (i.e., latitudes and longitudes) and the RSSI information collected at each section location within the cell are relationally combined to form a signal information profile database. Each entry within the signal information profile database may include, for example, a specific section location information along with the RSSI information at that specific section location. Referring now to FIG. 5, there is illustrated several exemplary entries within a signal information profile database, in accordance with a preferred embodiment of the present invention.

During operation, a mobile telephone within the cell may periodically receive a MAHO list from the MSC. As mentioned previously, the MAHO list includes MAHO signal readings from each base station located at the serving cell and at different cells neighboring the serving cell. These MAHO signal readings may be represented by a vector, $MAHO = \{maho_1, maho_2, maho_3, \ldots, maho_M\}$, where M is the maximum number of signal readings. This MAHO vector is then compared with the corresponding signal information vector, such as the RSSI information vector, of every entry stored in the signal information profile database by the following algorithm depicted in a pseudo-code form:

for i=1 to M;
  $d_i = rss_{x,i} - maho_i;$\*where x is the serving cell location
  compute variance of $d_i$;
loop.

The variable $d_i$ can be viewed as an error function between the MAHO vector and the RSSI information vector stored in the signal information profile database. The error function $d_i$ is then minimized by a statistical computation such as a variance. If the error function $d_i$ is represented as $\{d_1, d_2, d_3, \ldots, d_M\}$, and an average of the error function $d_i$ is $\bar{d}_i = 1/M * (d_1 + d_2 + \ldots + d_M)$, then the variance of the error function $d_i$ is $Var(d_i) = 1/N * [(d_1 - \bar{d}_i)^2 + (d_2 - \bar{d}_i)^2 + \ldots + (d_N - \bar{d}_i)^2]$. With the computed variance $Var(d_i)$, the vector entry within the signal information profile database having the minimum variance is then chosen such that the associated section location information indicates the most likely location of the mobile telephone within the cellular telephone communication network. Although a variance method is utilized to minimize the error function $d_i$, other statistical computation methods that are well-known in the art may also be employed.

As has been described, the present invention provides an improved method for locating a mobile telephone within a cellular telephone communication network. While there are at least two ways to implement the present invention, an IS-54 standard compliant mobile telephone having a MAHO listing capability is utilized to illustrate the present invention. One of the advantages of utilizing an IS-54 standard compliant mobile telephone is that no extra components are needed to be added to the mobile telephone for implementing the present invention.

It is important to note that the method of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or CD ROMs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method for locating a mobile telephone within a cellular telephone communication network having a plurality of cells, wherein each of said plurality of cells includes a base station coupled to at least one antenna, said method comprising the steps of:

dividing each entire individual cell into a plurality of sections using a set of substantially rectangular grids;

collecting location information and signal information at each of said plurality of sections within said cell for signals transmitted by said base station and other base stations located in cells adjacent to said cell;

processing said collected location information and said collected signal information into a signal information profile database; and determining a section in which said mobile telephone is located utilizing said signal information profile database, wherein each entry within said signal information profile database includes a location information and an associated signal information of a section, wherein said determining further includes receiving a mobile assisted hand-off signal from said mobile telephone;

calculating a difference between said mobile assisted hand-off signal and said collected signal information in each entry within said signal information profile database; and selecting an entry within said signal information profile database having a minimum variance in said calculated step to provide a location information of a section in which said mobile telephone is located within said cellular telephone communication network.

2. The method according to claim 1, wherein said collecting step is performed by a drive test.

3. The method according to claim 1, wherein said signal information is a received signal strength indication.

4. A cellular telephone communication system capable of locating a mobile telephone within a cellular telephone communication network having a plurality of cells, wherein each of said plurality of cells includes a base station coupled to at least one antenna, said cellular telephone communication system comprising:

means for dividing each entire individual cell into a plurality of sections using a set of substantially rectangular grids;

means for collecting location information and signal information at each of said plurality of sections within said cell for signals transmitted by said base station and other base stations located in cells adjacent to said cell;

means for processing said collected location information and said collected signal information into a signal information profile database; and means for determining a section in which said mobile telephone is located utilizing said signal information profile database, wherein each entry within said signal information profile database includes a location information and an associated signal information of a section, wherein said means for determining further includes
  means for receiving a mobile assisted hand-off signal from said mobile telephone:
  means for calculating a difference between said mobile assisted hand-off signal and said collected signal information in each entry within said signal information profile database; and
  means for selecting an entry within said signal information profile database having a minimum variance in said calculated step to provide a location information of a section in which said mobile telephone is located within said cellular telephone communication network.

5. The mobile telephone communication system according to claim 4, wherein said collecting means is a drive test.

6. The mobile telephone communication system according to claim 4, wherein said signal information is a received signal strength indication.

7. A computer program product for locating a mobile telephone within a cellular telephone communication network having a plurality of cells, wherein each of said plurality of cells includes a base station coupled to at least one antenna, said computer program product comprising:
  program code means for dividing each entire individual cell into a plurality of sections using a set of substantially rectangular grids;
  program code means for collecting location information and signal information at each of said plurality of sections within said cell for signals transmitted by said base station and other base stations located in cells adjacent to said cell;
  program code mean for processing said collected location information and said collected signal information into a signal information profile database; and
  program code means for determining a section in which said mobile telephone is located utilizing said signal information profile database, wherein each entry within said signal information profile database includes a location information and an associated signal information of a section, wherein said program code means for determining further includes
    program code means for receiving a mobile assisted hand-off signal from said mobile telephone;
    program code means for calculating: a difference between said mobile assisted hand-off signal and said collected signal information in each entry within said signal information profile database; and
    program code means for selecting an entry within said signal information profile database having a minimum variance in said calculated step to provide a location information of a section in which said mobile telephone is located within said cellular telephone communication network.

8. The computer program product according to claim 7, wherein said program code means for collecting means further includes a program code means for performing a drive test.

9. The computer program product according to claim 7, wherein said signal information is a received signal strength indication.

* * * * *